(12) United States Patent
Takeda et al.

(10) Patent No.: US 12,184,351 B2
(45) Date of Patent: Dec. 31, 2024

(54) TERMINAL, RADIO COMMUNICATION METHOD, BASE STATION, AND SYSTEM

(71) Applicant: NTT DOCOMO, INC., Tokyo (JP)

(72) Inventors: Kazuaki Takeda, Tokyo (JP); Satoshi Nagata, Tokyo (JP); Chongning Na, Beijing (CN); Xin Wang, Beijing (CN); Huiling Jiang, Beijing (CN); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 275 days.

(21) Appl. No.: 17/459,428

(22) Filed: Aug. 27, 2021

(65) Prior Publication Data

US 2021/0391932 A1 Dec. 16, 2021

Related U.S. Application Data

(63) Continuation of application No. 16/475,501, filed as application No. PCT/JP2018/000051 on Jan. 5, 2018, now abandoned.

(30) Foreign Application Priority Data

Jan. 6, 2017 (JP) .................. 2017-001437

(51) Int. Cl.
*H04B 17/345* (2015.01)
*H04W 24/08* (2009.01)
(Continued)

(52) U.S. Cl.
CPC .......... *H04B 17/345* (2015.01); *H04W 24/08* (2013.01); *H04W 72/23* (2023.01); *H04W 84/042* (2013.01); *H04W 88/02* (2013.01)

(58) Field of Classification Search
CPC ..... H04B 17/345; H04W 72/23; H04W 24/08
See application file for complete search history.

(56) References Cited

U.S. PATENT DOCUMENTS 9,008,585 B2 4/2015 Xiao et al.
2013/0182594 A1 7/2013 Kim et al.
(Continued)

FOREIGN PATENT DOCUMENTS

EP 2869478 A1 5/2015
JP 2014-513483 A 5/2014
(Continued)

OTHER PUBLICATIONS

Office Action issued in the counterpart European Patent Application No. 18736431.0, mailed on Aug. 1, 2022 (8 pages).
(Continued)

*Primary Examiner* — Ricky Q Ngo
*Assistant Examiner* — Stephen N Steiner
(74) *Attorney, Agent, or Firm* — Osha Bergman Watanabe & Burton LLP

(57) ABSTRACT

A terminal is disclosed that includes a receiver that receives, via higher layer signaling, configuration information indicating a first resource for interference measurement, a second resource of non-zero power (NZP) channel state information reference signal (CSI-RS) for interference measurement, and a third resource of NZP CSI-RS for channel measurement. The terminal also includes a processor that performs interference measurement by using the first resource or the second resource, and performs channel measurement by using the third resource. The configuration information indicates a plurality of combinations of a third resource candidate and at least one of a first resource candidate and a second resource candidate. The processor uses, for measurement, a combination indicated by downlink control information among the plurality of combinations. In other aspects, a radio communication method, a base station, and a system are also disclosed.

5 Claims, 13 Drawing Sheets

(51) Int. Cl.
*H04W 72/23* (2023.01)
*H04W 84/04* (2009.01)
*H04W 88/02* (2009.01)

(56) References Cited

U.S. PATENT DOCUMENTS

| | | |
|---|---|---|
| 2014/0016497 A1 | 1/2014 | Seo et al. |
| 2015/0016291 A1 | 1/2015 | Kim et al. |
| 2015/0131563 A1 | 5/2015 | Guo et al. |
| 2015/0162966 A1 | 6/2015 | Kim et al. |
| 2015/0319633 A1 | 11/2015 | Ji et al. |
| 2018/0042028 A1* | 2/2018 | Nam .............. H04L 5/0035 |
| 2018/0062724 A1* | 3/2018 | Onggosanusi ..... H04L 5/0055 |
| 2018/0091273 A1* | 3/2018 | Choi ............... H04L 5/005 |
| 2019/0386730 A1 | 12/2019 | Xiao et al. |

FOREIGN PATENT DOCUMENTS

| | | |
|---|---|---|
| WO | 2015005689 A1 | 1/2015 |
| WO | 2015167314 A1 | 11/2015 |

OTHER PUBLICATIONS

Office Action in counterpart Japanese Patent Application No. 2018-560401 issued on Jul. 26, 2022 (8 pages).
Huawei, HiSilicon; "DL RS design for NR CSI acquisition and beam management"; 3GPP TSG RAN WG1 Meeting #86bis, R1-1608817; Lisbon, Portugal; Oct. 10-14, 2016 (7 pages).
NTT Docomo; "Enhancements on MU Interference Measurement and MU-CQI Reporting"; 3GPP TSG RAN WG1 Meeting #86, R1-167350; Gothenburg, Sweden; Aug. 22-26, 2016 (5 pages).
International Search Report issued in PCT/JP2018/000051 mailed on Mar. 13, 2018 (2 pages).
Written Opinion of the International Searching Authority issued in PCT/JP2018/000051 mailed on Mar. 13, 2018 (3 pages).
CATT; "Aperiodic CSI-IM for interference measurement enhancement"; 3GPP TSG RAN WG1 Meeting #86bis, R1-1608725; Lisbon, Portugal; Oct. 10-14, 2016 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in the counterpart European Patent Application No. 18736431.0, mailed Jul. 27, 2020 (10 pages).
Office Action in counterpart Japanese Patent Application No. 2018-560401 issued on Feb. 8, 2022 (8 pages).
LG Electronics; "Discussion on CSI measurement framework"; 3GPP TSG RAN WG1 Meeting #87, R1-1611822; Reno, USA; Nov. 14-18, 2016 (6 pages).
Office Action issued in the counterpart Chinese Patent Application No. 201880015600.1, mailed on Jan. 13, 2022 (19 pages).
Office Action issued in the counterpart Chinese Patent Application No. 201880015600.1, mailed on May 31, 2022 (17 pages).
Office Action issued in corresponding European Application No. 18736431.0, mailed May 2, 2024 (5 pages).

* cited by examiner

| BIT | CSI-RS RESOURCE INDICATION MESSAGE |
|---|---|
| 000 | CSI-RS RESOURCE #0 |
| 001 | CSI-RS RESOURCE #1 |
| 010 | CSI-RS RESOURCE #2 |
| 011 | CSI-RS RESOURCE #3 |
| 100 | CSI-RS RESOURCE #4 |
| 101 | CSI-RS RESOURCE #5 |
| 110 | CSI-RS RESOURCE #6 |
| 111 | CSI-RS RESOURCE #7 |

FIG. 4A

| BIT | CSI-IM RESOURCE INDICATION MESSAGE |
|---|---|
| 000 | CSI-IM RESOURCE #0 |
| 001 | CSI-IM RESOURCE #1 |
| 010 | CSI-IM RESOURCE #2 |
| 011 | CSI-IM RESOURCE #3 |
| 100 | CSI-IM RESOURCE #4 |
| 101 | CSI-IM RESOURCE #5 |
| 110 | CSI-IM RESOURCE #6 |
| 111 | CSI-IM RESOURCE #7 |

FIG. 4B

CSI-IM RESOURCE INDICATION

| BIT | MESSAGE |
|-----|---------|
| 000 | CSI-IM RESOURCE #0 |
| 001 | CSI-IM RESOURCE #1 |
| 010 | CSI-IM RESOURCE #2 |
| 011 | CSI-IM RESOURCE #3 |
| 100 | CSI-IM RESOURCE #4 |
| 101 | CSI-IM RESOURCE #5 |
| 110 | CSI-IM RESOURCE #6 |
| 111 | CSI-IM RESOURCE #7 |

FIG. 6

TERMINAL, RADIO COMMUNICATION METHOD, BASE STATION, AND SYSTEM

CROSS-REFERENCE TO RELATED APPLICATIONS

This application is a continuation application of U.S. patent application Ser. No. 16/475,501, filed on Jul. 2, 2019, which is a national phase application of PCT/JP2018/000051, filed on Jan. 5, 2018, which claims priority to Japanese Patent Application No. 2017-001437, filed on Jan. 6, 2017. The contents of these applications are hereby incorporated by reference in their entirety.

TECHNICAL FIELD

The present invention relates to a terminal, a radio communication method, a base station and a system in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+ (plus)," "NR (New Radio)," "NX (New radio access)," "New RAT (Radio Access Technology)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. Furthermore, in CA, a plurality of CCs under the same radio base station (referred to as an "eNB (eNodeB)," a "BS" (Base Station) and so on) are configured in a user terminal (UE: User Equipment).

Meanwhile, in LTE Rel. 12, dual connectivity (DC), in which multiple cell groups (CG) formed by different radio base stations are configured in a user terminal, is also introduced. Each cell group is comprised of at least one cell (CC). Since multiple CCs of different radio base stations are aggregated in DC, DC is also referred to as "inter-base station CA (inter-eNB CA)."

Also, in LTE Rel. 8 to 12, frequency division duplex (FDD), in which downlink (DL) transmission and uplink (UL) transmission are made in different frequency bands, and time division duplex (TDD), in which downlink transmission and uplink transmission are switched over time and made in the same frequency band, are introduced.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill varying requirements (for example, ultra-high speed, large capacity, ultra-low latency, etc.).

For example, 5G/NR are under study to provide radio communication services referred to as "eMBB (enhanced Mobile Broad Band)," "IoT (Internet of Things)," "mMTC (massive Machine Type Communication)," "M2M (Machine To Machine)," "URLLC (Ultra Reliable and Low Latency Communications)" and so on.

In 5G/NR, MU-MIMO (Multi User Multi Input Multi Output) of eight layers (transmission layers) or more is under research. By this means, user terminals face more complicated multi-user interference states, and how to measure interference is a problem.

The present invention has been made in view of the above, and it is therefore an object of the present invention to provide a user terminal and a radio communication method, whereby interference measurements can be configured in a flexible manner when transmission is made in multiple layers.

Solution to Problem

According to one aspect of the present invention, a user terminal has a receiving section that receives a DL signal, and a control section that controls measurement of the DL signal, and, in this user terminal, the receiving section receives information related to an interference measurement resource including a combination of a plurality of ports and/or channels, and the control section controls the measurement of the DL signal based on the information related to the interference measurement resource.

Advantageous Effects of Invention

According to the present invention, it is possible to flexibly configure interference measurement when transmission is made in multiple layers.

BRIEF DESCRIPTION OF DRAWINGS

FIGS. 4A and 4B are diagrams to show examples of CSI-RS resource indications and CSI-IM resource indications;

FIG. 6 is a diagram to show examples of CSI-IM resource indications;

DESCRIPTION OF EMBODIMENTS

In 5G, study is in progress to provide services using a very high carrier frequency of, for example, maximum 100 GHz. Generally, it becomes more difficult to secure coverage as the carrier frequency increases. The reasons for this include that the distance-induced attenuation becomes more severe and the rectilinearity of radio waves becomes stronger, the transmission power density decreases because ultra-wide-band transmission is performed, and so on.

Therefore, in order to fulfill the requirements for a variety of types of communication such as those named above even in high frequency bands, studies are in progress to use massive MIMO (Massive MIMO, eFD-MIMO (enhanced Full Dimension Multiple Input Multiple Output)), which uses a very large number of antenna elements. When a very large number of antenna elements are used, beams (antenna directivity) can be formed by controlling the amplitude and/or the phase of the signals transmitted/received from each element. This process is also referred to as beam "forming (BF)," and it becomes possible to reduce the propagation loss of radio waves. Furthermore, research is under way to increase the number of layers by applying massive MIMO to MU-MIMO.

In order to improve the performance of MU-MIMO, it is necessary for user terminals to measure interference accurately and to feed back (report) the measurement result using CSI (Channel State Information) and so on. CSI includes channel states, represented by at least one of CQI (Channel Quality Indicator), PMI (Precoding Matrix Indicator) and RI (Rank Indicator).

Figure 1:
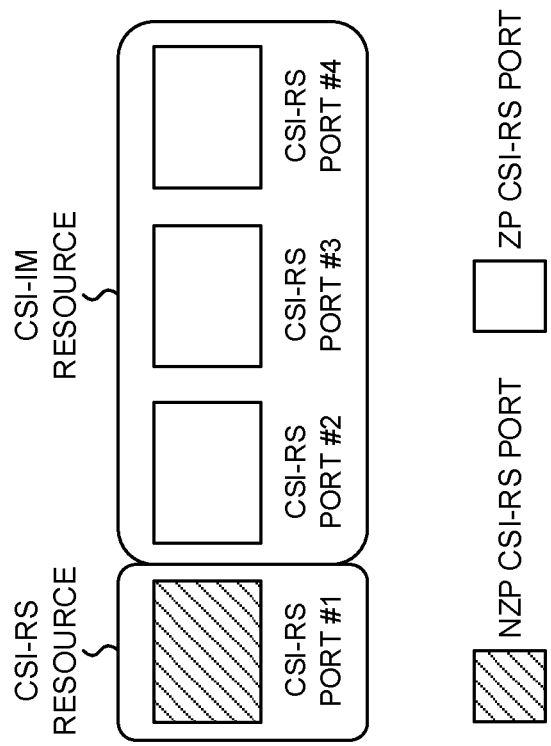
FIG. 1 is a diagram to show examples of resources for CSI measurement during multi-layer transmission.

FIG. 1 is a diagram to show examples of resources for CSI measurement during multi-layer transmission.

For CSI measurements, for example, CSI-RS (Channel State Information-Reference Signal) and CSI-IM (Channel State Information-Interference Measurement) are used. CSI-RS is, for example, a non-zero power (NZP) CSI-RS, with which the transmission power is distributed. CSI-IM is, for example, a zero power (ZP) CSI-RS, with which the transmission power is not distributed (muted).

A radio base station schedules CSI measurement, and reports the CSI-RS resource allocated to the CSI-RS and the CSI-IM resource allocated to the CSI-IM, to a user terminal. The CSI-RS resource is, for example, the port (antenna port) assigned to the NZP-CSI-RS. The CSI-IM resource is, for example, the port assigned to the ZP-CSI-RS.

In this drawing, the CSI-RS resource is CSI-RS port #1 assigned to the NZP-CSI-RS. The CSI-IM resource is CSI-RS ports #2 to #4 assigned to the ZP-CSI-RS.

In the CSI-RS resource, The NZP-CSI-RS is transmitted to the user terminal that performs CSI measurements, so the user terminal measures the received power in the CSI-RS resource as the signal power. In the CSI-IM resource, the signal to the user terminal is muted, so the user terminal measures the received power in the CSI-IM resource as interference-plus-noise power.

In MU-MIMO, a radio base station transmits DL signals to a plurality of user terminals in a plurality of layers. Therefore, in addition to the inter-cell interference (ICI) from the DL signals for other cells, the user terminal receives multi-user interference (MUI) from the DL signals for other user terminals in the instant cell. As the number of layers increases, the state of interference becomes even more complicated. Also, the number of candidate CSI-RS resources and the number of candidate CSI-IM resources are limited. Therefore, the problem in measuring complex interference states lies in how to configure measurement resources in the user terminal. Also, optimal interference measurement reference signals vary, depending on the scheduling frequency, interference conditions and so on.

Therefore, the present inventors propose that a user terminal receive information related to interference measurement resources, including combinations of a plurality of ports and/or channels, and control DL signal measurements based on the information related to interference measurement resources. This allows a radio base station to flexibly configure, in the user terminals, CSI measurements for complicated interference.

Now, embodiments of the present invention will be described in detail below with reference to the accompanying drawings. Note that the radio communication methods of the above-described embodiments may be applied individually or may be applied in combination.

(Radio Communication Method)

In the present embodiment, a radio base station configures interference measurement resources, which are resources that a user terminal can use in CSI measurements in a specific period. In addition, in the present embodiment, a case where the period for configuring interference measurement resources is a slot will be described, but this period may be a period other than a slot (for example, one of a subframe, a minislot, a subslot, a radio frame and a symbol). In the CSI measurement, at least one of a signal addressed to the measuring user terminal, MUI, ICI, and noise may be measured.

At least one of an NZP-CSI-RS for simulating a multi-user interference signal, a ZP-CSI-RS for use with the multi-user interference signal, a demodulation reference signal (DMRS) for use with an actual multi-user interference signal, and another reference signal in NR can be used as a reference signal for use in CSI measurements.

DMRS is used in channel estimation for PDSCH (Physical Downlink Shared Channel) demodulation. Another reference signal in NR may be a mobility reference signal (MRS), which is used in measurements for beam selection, or may be a phase noise compensation reference signal (PTRS: Phase Tracking Reference Signal), which is used to compensate for phase noise. Furthermore, reference signals for interference measurements are not limited to these.

A single interference measurement resource may contain a combination of different types of resources (for example, ports and/or channels). For example, an interference measurement resource may include at least two of the port assigned to the NZP-CSI-RS (NZP-CSI-RS port), the port assigned to the ZP-CSI-RS (ZP-CSI-RS port), port assigned to the DMRS (DMRS port), the PDSCH corresponding to the DMRS port, and the port assigned to another reference signal in NR. In addition, the NZP-CSI-RS port and the ZP-CSI-RS port may be both regarded as "CSI-RS ports."

The radio base station may configure a signal measurement resource, which is a resource for use in measuring a DL signal for a user terminal, in this user terminal. The signal measurement resource may be a port and/or a channel assigned to a DL signal with non-zero transmission power. Also, the signal measurement resource may include at least one port and/or channel in the interference measurement resource. A signal measurement resource may be referred to as a "signal port."

A signal measurement resource is, for example, at least one of the NZP-CSI-RS port, the DMRS port, the PDSCH corresponding to the DMRS port and the port assigned to another reference signal in NR.

Note that the interference measurement resource and the signal measurement resource may indicate the time resource (for example, a symbol) and the frequency resource (for example, a subcarrier) assigned to the reference signal of each port.

The radio base station commands CSI measurement, and reports the signal measurement resource and/or the interference measurement resource that pertain to the CSI measurement period, to the user terminal. The radio base station may report the signal measurement resource and/or the interference measurement resource periodically, or report the signal measurement resource and/or the interference measurement resource aperiodically. The periodicity of reporting signal measurement resources may be different from the periodicity reporting interference measurement resources.

If both a signal measurement resource and an interference measurement resource are configured in a certain period, the user terminal identifies the CSI-RS (signal component) and the CSI-IM (interference component and noise component) based on these signal measurement resource and interference measurement resource.

Multiple candidate signal measurement resources and/or multiple candidate interference measurement resources may be configured in the user terminal in advance. Also, prior to CSI measurement, the radio base station may report a plurality of candidate signal measurement resources and/or multiple candidate interference measurement resources to the user terminal by using at least one of system information (for example, at least one of the master information block (MIB) and system information blocks (SIBs)), higher layer signaling (for example, at least one of RRC (Radio Resource Control) signaling and MAC (Medium Access Control) signaling), and physical layer signaling (for example, DCI).

Upon CSI measurement, the radio base station may report identification information (for example, an index) that specifies one signal measurement resource among a plurality of candidate signal measurement resources, to the user terminal, or report identification information that specifies one interference measurement resource among a plurality of candidate resources, to the user terminal. For example, the radio base station may report the identification information using physical layer signaling (for example, DCI). The user terminal may specify the resource corresponding to the identification information that is reported.

Thus, the radio base station reports information that identifies a signal measurement resource and/or an interference measurement resource, so that it is possible to reduce the amount of information to report upon CSI measurement.

Also, upon CSI measurement, the radio base station may report information related to the configuration of the signal measurement resource to the user terminal. For example, the radio base station may report the signal measurement resource using physical layer signaling (for example, DCI). This allows the radio base station to configure signal measurement resources dynamically (for example, on a per slot basis).

Hereinafter, the interference measurement resource will be referred to as "CSI-IM resource."

First Aspect

The CSI-IM resource according to the first aspect includes an NZP-CSI-RS port and/or a ZP-CSI-RS port.

In the first aspect, the signal measurement resource will be referred to as "CSI-RS resource." The CSI-RS resource is at least one NZP-CSI-RS port assigned to a user terminal that performs CSI measurement.

Figure 2:
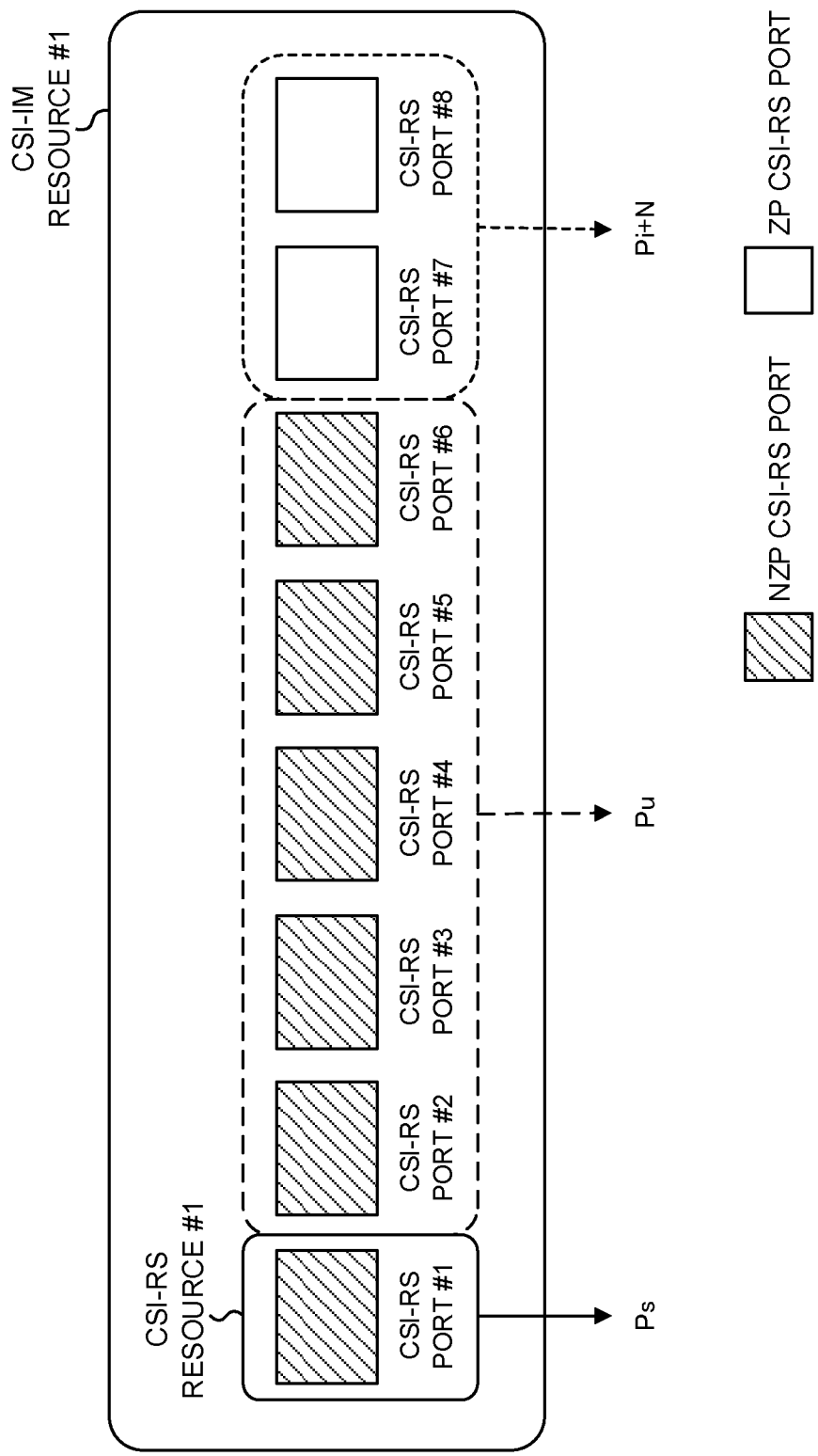
FIG. 2 is a diagram to show an example of an operation in which a user terminal specifies resources for CSI measurement.

FIG. 2 is a diagram to show an example of an operation in which the user terminal specifies resources for CSI measurement.

In this drawing, CSI-IM resource #1 and CSI-RS resource #1 are configured in a specific slot. CSI-IM resource #1 includes CSI-RS ports #1 to #6 assigned to the NZP-CSI-RS and CSI-RS ports #7 and #8 assigned to the ZP-CSI-RS. CSI-RS resource #1 includes CSI-RS port #1 assigned to the NZP-CSI-RS. That is, CSI-IM resource #1 includes CSI-RS resource #1.

When both a CSI-RS resource and a CSI-IM resource are configured in a given slot and several CSI-RS ports are included in both of the CSI-RS resource and the CSI-IM resource, the user terminal treats the CSI-RS ports as CSI-RSs, and treats the ports other than the CSI-RS ports in the CSI-IM resources as CSI-IMs.

In this drawing, in a specific slot, CSI-IM resource #1 and CSI-RS resource #1 are configured, and CSI-RS port #1 is included in both CSI-IM resource #1 and CSI-RS resource #1, so that the user terminal treats CSI-RS port #1 as an CSI-RS and treats CSI-RS ports #2 to #8 as CSI-IMs.

The user terminal measures the received power of CSI-RS port #1 specified as a CSI-RS as the signal power Ps.

Among the resources specified as CSI-IMs, the NZP-CSI-RS port is assigned as a CSI-RS resource to other users in the instant cell. Therefore, the user terminal measures the received power of the NZP-CSI-RS port among the CSI-IMs as the interference (MUI) power Pu arising from the DL signals for other user terminals in the instant cell.

Among the resources specified as CSI-IMs, the ZP-CSI-RS port is assigned as a CSI-RS resource (NZP-CSI-RS port) in other cells. Therefore, among the CSI-IMs, the user terminal measures the received power of the ZP-CSI-RS port as the sum (Pi+N) of the interference (ICI) power Pi and the noise power N from the DL signals for other cells.

Thereafter, based on these measurement results, the user terminal calculates the SINR (Signal to Interference plus Noise Ratio) using the following equation:

$$\text{SINR} = P_s / (P_u + P_i + N) \tag{Equation 1}$$

Thereafter, the user terminal calculates the CQI (Channel Quality Indicator) based on the SINR, and reports the CQI to the radio base station.

Note that, in the CSI measurement, the user terminal may not use one or two of Ps, Pu and Pi+N. For example, if the CSI-IM resource does not include a ZP-CSI-RS port, the user terminal may calculate the SINR without using Pi+N. By this means, the user terminal can measure the impact of MUI. For example, if the CSI-IM resource does not include an NZP-CSI-RS port other than the CSI-RS resource, the user terminal may calculate the SINR without using Pu. This allows the user terminal to measure the impact of ICI and noise.

Next, the method of reporting the CSI-RS resource and/or the CSI-IM resource from the radio base station to the user terminal will be described.

The radio base station can command CSI measurement to the user terminal by using DL control information (DCI).

Figure 3:
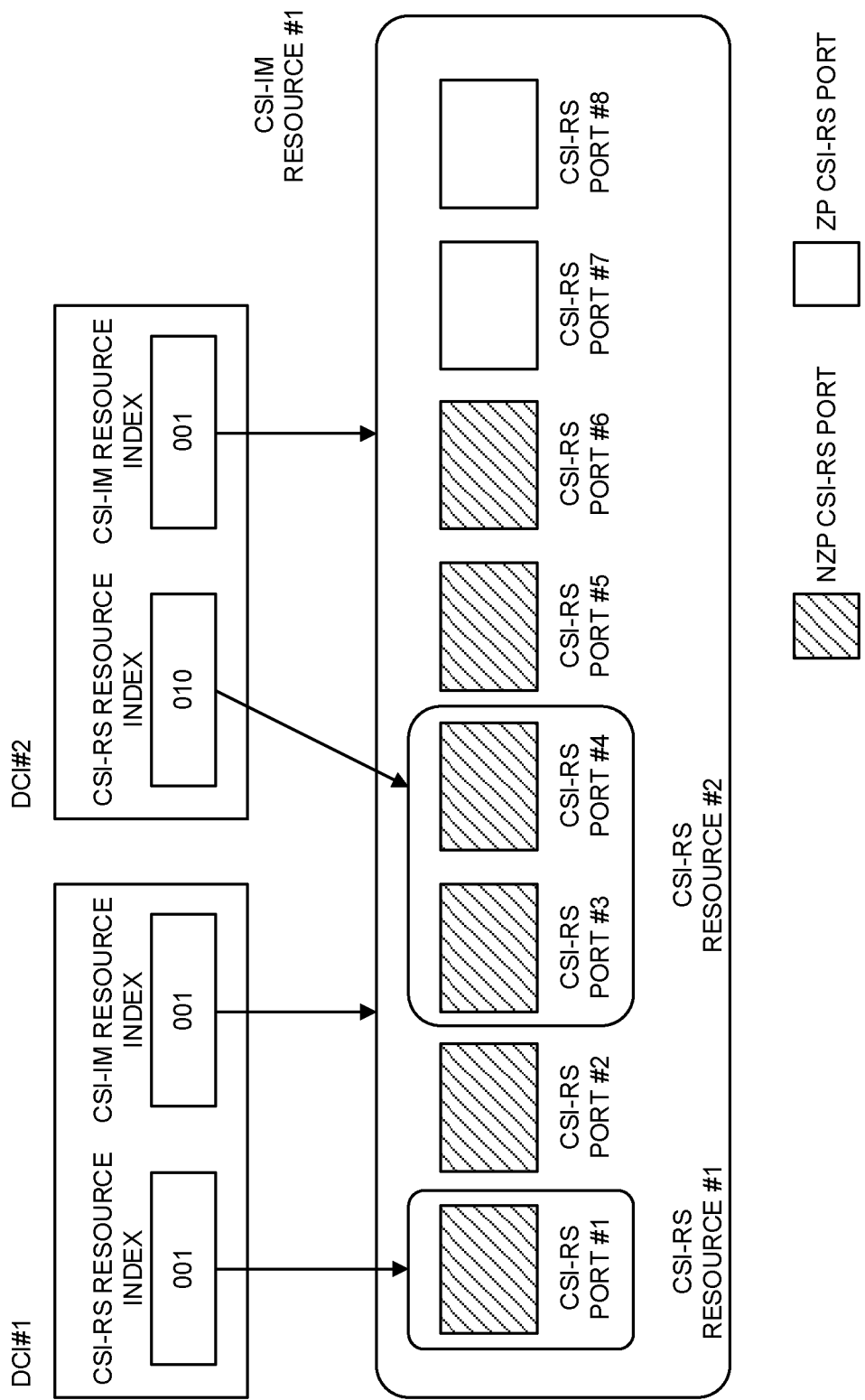
FIG. 3 is a diagram to show examples of DCIs upon CSI measurement according to the first aspect of the present invention.

FIG. 3 is a diagram to show examples of DCIs upon CSI measurement according to the first aspect of the present invention.

Two fields for CSI measurement may be added to an existing DCI format. The two fields are, for example, a three-bit CSI-RS resource index indicating a CSI-RS resource, and a three-bit CSI-IM resource index indicating a CSI-IM resource. Note that the CSI-RS resource index and/or the CSI-IM resource index need not be three bits.

Prior to CSI measurement, a CSI-RS resource associated with a CSI-RS resource index may be configured in the user terminal, A CSI-IM resource associated with a CSI-IM resource index may be configured in the user terminal.

If CSI measurement to measure signal power is conducted in a given slot, the DCI of that slot includes a CSI-RS resource index. Also, if CSI measurement to measure interference power is performed in a given slot, the DCI of that slot includes a CSI-IM resource index.

By performing CSI measurement to measure signal power and interference power in a specific slot, it is possible to include a CSI-RS resource index and a CSI-IM resource index in DCI #1 of that slot. In DCI #1, the CSI-RS resource index is "001," and the CSI-IM resource index is "001." The user terminal, receiving DCI #1 specifies CSI-RS resource #1 corresponding to the CSI-RS resource index "001," and specifies CSI-IM resource #1 corresponding to the CSI-IM resource index "001." Here, CSI-RS resource #1 includes CSI-RS port #1.

CSI measurement is made by a different user terminal and/or in a different slot than DCI #1, so that DCI #2 of that slot includes a CSI-RS resource index and a CSI-IM resource index. In DCI #2, the CSI-RS resource index indicates "010," and the CSI-IM resource index indicates "001." When receiving DCI #2, the user terminal specifies CSI-RS resource #2 corresponding to the CSI-RS resource index "010," and specifies CSI-IM resource #1 corresponding to the CSI-IM resource index "001." Here, CSI-RS resource #2 includes CSI-RS ports #3 and #4. Thus, a plurality of CSI-RS ports included in a CSI-RS resource correspond to a plurality of layers assigned to that user terminal.

Prior to CSI measurement, the radio base station may report CSI-RS resource indications, which indicate multiple candidates for the CSI-RS resource, and/or CSI-IM resource indications, which indicate multiple candidates for the CSI-IM resource, to the user terminal, by using at least one of system information, higher layer signaling and physical layer signaling.

FIGS. 4A and 4B are diagrams showing examples of CSI-RS resource indications and CSI-IM resource indications.

The CSI-RS resource indications in FIG. 4A show multiple CSI-RS resource indices as CSI-RS resource index candidates. The CSI-RS resource indications further indicate the CSI-RS resources associated with each CSI-RS resource index.

Similarly, the CSI-IM resource indications in FIG. 4B show multiple CSI-IM resource indices as CSI-IM resource index candidates. The CSI-IM resource indications further indicate the CSI-IM resources associated with each CSI-IM resource index.

The user terminal selects the CSI-RS resource corresponding to the CSI-RS resource index indicated by the DCI, from the CSI-RS resource indications. In addition, the user terminal selects the CSI-IM resource corresponding to the CSI-IM resource index indicated by the DCI, from the CSI-IM resource indications.

CSI-RS resource #0 may be an indication that no port is included (signal power measurement is not commanded). This allows the radio base station to command CSI measurement to measure only the interference power in a particular slot, and report only the CSI-IM resource.

Likewise, CSI-IM resource #0 may be an indication that no port is included (CSI measurement is not commanded). This allows the radio base station to command CSI measurement to measure only the signal power in a particular slot, and report only the CSI-RS resource.

Also, if neither a CSI-RS resource nor a CSI-IM resource is configured in a given slot, it is possible to keep the above bits attached, and the user terminal may ignore these bits. Alternatively, in this slot, the above bits may be used for another purpose. Furthermore, the above bits need not be included in DCI.

Next, the CSI measurement in FIG. 3 above will be described in detail below.

CSI-IM resource #1 includes CSI-RS ports #1 to #8. Of these, CSI-RS ports #1 to #6 are NZP-CSI-RS ports. CSI-RS ports #7 and #8 are ZP-CSI-RS ports.

CSI-RS resource #1 includes CSI-RS port #1. CSI-RS port #1 is an NZP-CSI-RS port.

The radio base station configures the CSI measurement in a specific slot and triggers (reports) CSI-RS resource #1 and CSI-IM resource #1 using DCI #1. In this case, CSI-RS port #1 is included in both CSI-RS resource #1 and CSI-IM resource #1, so that the user terminal treats CSI-RS port #1 as a CSI-RS, and treats CSI-RS ports #2 to #8, which are ports other than the CSI-RS port, among the CSI-IM resources, as CSI-IMs.

The user terminal measures the received power of CSI-RS port #1 (the CSI-RS of CSI-RS port #1) identified as a CSI-RS as the signal power Ps.

The user terminal measures the received power of CSI-RS ports #2 to #6 (CSI-RS of CSI-RS ports #2 to #6) which are NZP-CSI-RS ports among CSI-RS ports #2 to #8 identified as CSI-IMs, as the MUI power Pu. Among CSI-RS ports #2 to #8 identified as CSI-IMs, the user terminal measures the received power of CSI-RS ports #7 and #8, which are ZP-CSI-RS ports, as the total power (Pi+N) of ICI power and noise power.

Furthermore, the user terminal calculates Ps/(Pu+Pi+N) as the SINR using equation 1, calculates CQI based on the SINR, and reports the CQI to the radio base station.

CSI-RS resource #2 includes CSI-RS ports #3 and #4. CSI-RS ports #3 and #4 correspond to layers #1 and #2, respectively.

The radio base station configures CSI measurement in another user terminal and/or in another slot, and triggers CSI-RS resource #2 and CSI-IM resource #1. In this case, CSI-RS ports #3 and #4 are included in both CSI-RS resource #2 and CSI-IM resource #1, so that the user terminal treats CSI-RS port #2 as a CSI-RS and treats CSI-RS ports #1, #2 and #5 to #8 as CSI-IMs.

The user terminal measures the received power of CSI-RS port #3 as the signal power Ps1 of layer #1. The user terminal measures the received power of CSI-RS port #4 as the signal power Ps2 of layer #2.

Among CSI-RS ports #1, #2 and #5 to #8, the user terminal receives CSI-RS ports #1, #2, #5 and #6, which are NZP-CSI-RS ports, as the MUI power Pu. Among CSI-RS ports #2 to #8, the user terminal measures the received power of CSI-RS ports #7 and #8, which are ZP-CSI-RS ports, as the sum (Pi+N) of ICI power and noise power.

Furthermore, the user terminal calculates Ps1/(Pu+Pi+N) as the SINR of layer #1 using equation 1, and calculates Ps2/(Pu+Pi+N) as the SINR of layer #2. Furthermore, the user terminal calculates a CQI based on the SINR of layer #1 and a CQI based on the SINR of layer #2, and reports these two CQIs to the radio base station.

As described above, by distinguishing between the resources to use for Ps, Pu and Pi+N, the accuracy of CSI measurement including multi-user interference can be improved.

Furthermore, the user terminal specifies the resources to use for Ps, Pu and Pi+N based on the CSI-IM resource and the CSI-RS resource, so that the radio base station can flexibly configure the resources to use in CSI measurement. Even if, for example, the number of candidate CSI-RS resources and/or the number of candidate CSI-IM resources are limited, the radio base station can increase the types of resources for use for CSI measurement by configuring the combinations of CSI-IM resources and CSI-RS resources.

Second Aspect

The CSI-IM resource according to the second aspect of the present invention includes a DMRS port and/or a ZP-CSI-RS port.

In the second aspect, the signal measurement resource will be referred to as the "PDSCH port." The PDSCH port is at least one DMRS port for use in PDSCH transmission.

If, in a given slot, both PDSCH transmission and a CSI-IM resource are configured, and, furthermore, several DMRS ports are included in both the PDSCH port and the CSI-IM resource, the user terminal treats these DMRS ports as CSI-RSs, and treats the ports other than the CSI-RS in the CSI-IM resource as CSI-IMs.

The user terminal measures the received power of the CSI-RS as the signal power Ps.

Among the resources specified as CSI-IMs, the DMRS port is assigned as a PDSCH port to other users in the instant cell. Therefore, the user terminal measures the received power of the DMRS port among the CSI-IMs as the interference (MUI) power Pu from other users in the instant cell.

Among the resources specified as CSI-IMs, the ZP-CSI-RS port is assigned as a PDSCH port in other cells. Accordingly, the user terminal measures the received power of the ZP-CSI-RS port among the CSI-IMs as the sum (Pi+N) of the interference (ICI) power Pi and the noise power N from the other cells.

The radio base station may command CSI measurement to the user terminal using DCI.

Figure 5:
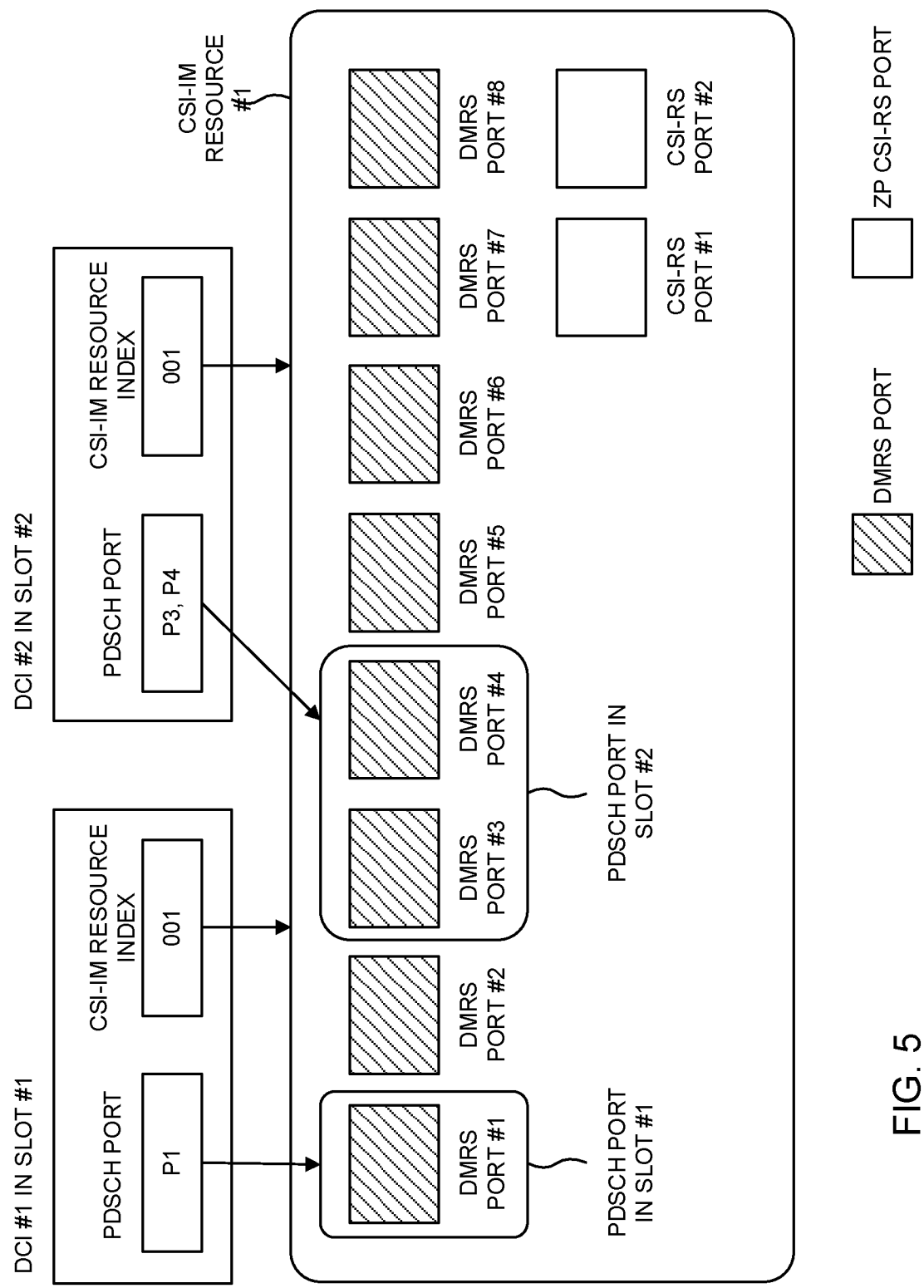
FIG. 5 is a diagram to show examples of DCIs upon CSI measurement according to a second aspect of the present invention.

FIG. 5 is a diagram to show examples of DCIs upon CSI measurement according to the second aspect.

One field for CSI measurement may be added to an existing DCI format. For example, this field is a three-bit CSI-IM resource index that indicates one CSI-IM resource.

Before CSI measurement, a CSI-IM resource that is associated with a CSI-IM resource index may be configured in the user terminal.

When CSI measurement is conducted in a given slot, the DCI of that slot includes a CSI-IM resource index.

Also, when PDSCH transmission is performed in a given slot, the DCI of that slot includes a PDSCH port (DMRS port indication). The PDSCH port indicates a DMRS port that is compatible with PDSCH transmission. For example, DCI format 2C/2D of LTE includes indications of the antenna port (DMRS port) used for PDSCH transmission, the scrambling ID, and the number of layers. When multiple layers are assigned to PDSCH transmission, the PDSCH port will indicate the DMRS port corresponding to each layer.

When CSI measurement and PDSCH transmission are performed in slot #1, DCI #1 of slot #1 includes a CSI-IM resource index and a PDSCH port. In DCI #1, the CSI-IM resource index indicates "001," and the PDSCH port indicates DMRS port #1. The user terminal, having received DCI #1, specifies CSI-IM resource #1 corresponding to the CSI-IM resource index "001," and specifies DMRS port #1 as the PDSCH port.

CSI measurement and PDSCH transmission are performed in slot #2, so that DCI #2 of slot #2 includes a CSI-IM resource index and a PDSCH port. In DCI #2, the CSI-IM resource index indicates "001," and the PDSCH port indicates DMRS ports #3 and #4. The user terminal having received DCI #2 specifies CSI-IM resource #1 corresponding to the CSI-IM resource index "001," and specifies DMRS ports #3 and #4 as PDSCH ports.

Prior to CSI measurement, the radio base station may report CSI-IM resource indications, which indicate multiple candidates for the CSI-IM resource, to the user terminal, by using at least one of system information, higher layer signaling and physical layer signaling.

FIG. 6 is a diagram to show examples of CSI-IM resource indications.

In this diagram, the CSI-IM resource indications show multiple CSI-IM resource indices that are candidates for the CSI-IM resource index. The CSI-IM resource indications further indicate the CSI-IM resources associated with each CSI-IM resource index.

The user terminal selects the CSI-IM resource corresponding to the CSI-IM resource index indicated by DCI, from the CSI-IM resource indications.

CSI-IM resource #0 may be an indication that no port is included (interference power measurement is not commanded). This allows the radio base station to command CSI measurement to measure only the signal power in a specific slot and report only the PDSCH port, or command CSI measurement to measure only the interference power and report only the CSI-IM resource.

Next, the CSI measurements in FIG. 5 above will be explained in detail below.

CSI-IM resource #1 includes DMRS ports #1 to #8 and CSI-RS ports #1 and #2. CSI-RS ports #1 and #2 are ZP-CSI-RS ports.

The radio base station configures transmission of PDSCH #1 and CSI measurement in slot #1, and, using DCI #1, triggers (reports) the PDSCH port of PDSCH #1 and CSI-IM resource #1. The PDSCH port of PDSCH #1 includes DMRS port #1.

In this case, DMRS port #1 is included in both the PDSCH port of the PDSCH #1 and CSI-IM resource #1, so that the user terminal treats DMRS port #1 as a CSI-RS, and treats DMRS ports #2 to #8, which are ports other than the CSI-RS and CSI-RS ports #1 and #2, as CSI-IMs in the CSI-IM resources.

The user terminal measures the received power of DMRS port #1 (the DMRS and/or the PDSCH of DMRS port #1) identified as a CSI-RS as the signal power Ps.

The user terminal measures the received power of DMRS ports #2 to #8 (the DMRSs and/or the PDSCHs of DMRS ports #2 to #8), which are DMRS ports among the ports identified as CSI-IMs, as the MUI power Pu. The user terminal measures the received power of CSI-RS ports #1 and #2, which are ZP-CSI-RS ports among the ports identified as CSI-IMs, as the sum (Pi+N) of ICI power and noise power.

Furthermore, the user terminal calculates Ps/(Pu+Pi+N) as the SINR using equation 1, calculates CQI based on the SINR, and reports the CQI to the radio base station.

Furthermore, the radio base station configures transmission of PDSCH #2 and CSI measurement in slot #2, and, using DCI #2, triggers the PDSCH port of PDSCH #2 and CSI-IM resource #1. The PDSCH port of PDSCH #2 includes DMRS port #1. CSI-IM resource #1 includes DMRS ports #3 and #4. DMRS ports #3 and #4 correspond to layers #1 and #2, respectively.

In this case, DMRS ports #3 and #4 are included in both the PDSCH port of the PDSCH #2 and CSI-IM resource #1, so that the user terminal treats DMRS port #2 as a CSI-RS and treats DMRS ports #1, #2 and #5 to #8, which are ports other than the CSI-RS among the CSI-IM resources, and CSI-RS ports #1 and #2, as CSI-IMs.

The user terminal measures the received power of DMRS port #3 identified as a CSI-RS as the signal power Ps1 of layer #1. The user terminal measures the received power of DMRS port #4 identified as a CSI-RS as the signal power Ps2 of layer #2.

The user terminal measures the received power of DMRS ports #1, #2, and #5 to #8, which are DMRS ports among the ports identified as CSI-IMs, as the MUI power Pu. The user terminal measures the received power of CSI-RS ports #1 and #2, which are ZP-CSI-RS ports among the ports identified as CSI-IMs, as the sum (Pi+N) of ICI power and noise power.

This enables the user terminal to measure the signal power Ps1 and Ps2 using CSI-RSs, and measure the interference-plus-noise power Pu+Pi+N using CSI-IMs.

Furthermore, the user terminal calculates Ps1/(Pu+Pi+N) as the SINR of layer #1 using equation 1, and calculates Ps2/(Pu+Pi+N) as the SINR of layer 2. Furthermore, the user terminal calculates the CQI of layer #1, which is based on the SINR of layer #1, and the CQI of layer #2, which is based on the SINR of layer #2, and reports these two CQIs to the radio base station.

The user terminal can measure the actual MUI by measuring CSI using the DMRSs and/or PDSCHs received at the DMRS ports, so that the accuracy of CSI measurement can be improved.

By including DMRS ports in CSI-IM resources, it is no longer necessary to allocate resources to reference signals (for example, CSI-RS) used only in CSI measurement, so that the resource utilization efficiency can be improved.

Third Aspect

The third aspect of the present invention uses the same CSI-RS resource and CSI-IM resource as in the first aspect, but the method of reporting the CSI-RS resource is different. In the third aspect, it is not necessary to configure multiple candidates for the CSI-RS resources in the user terminal before CSI measurement. Alternatively, only a plurality of candidates for the CSI-IM resource may be configured in the user terminal. In this case, the radio base station may report the ports included in the CSI-RS resource using DCI.

Figure 7:
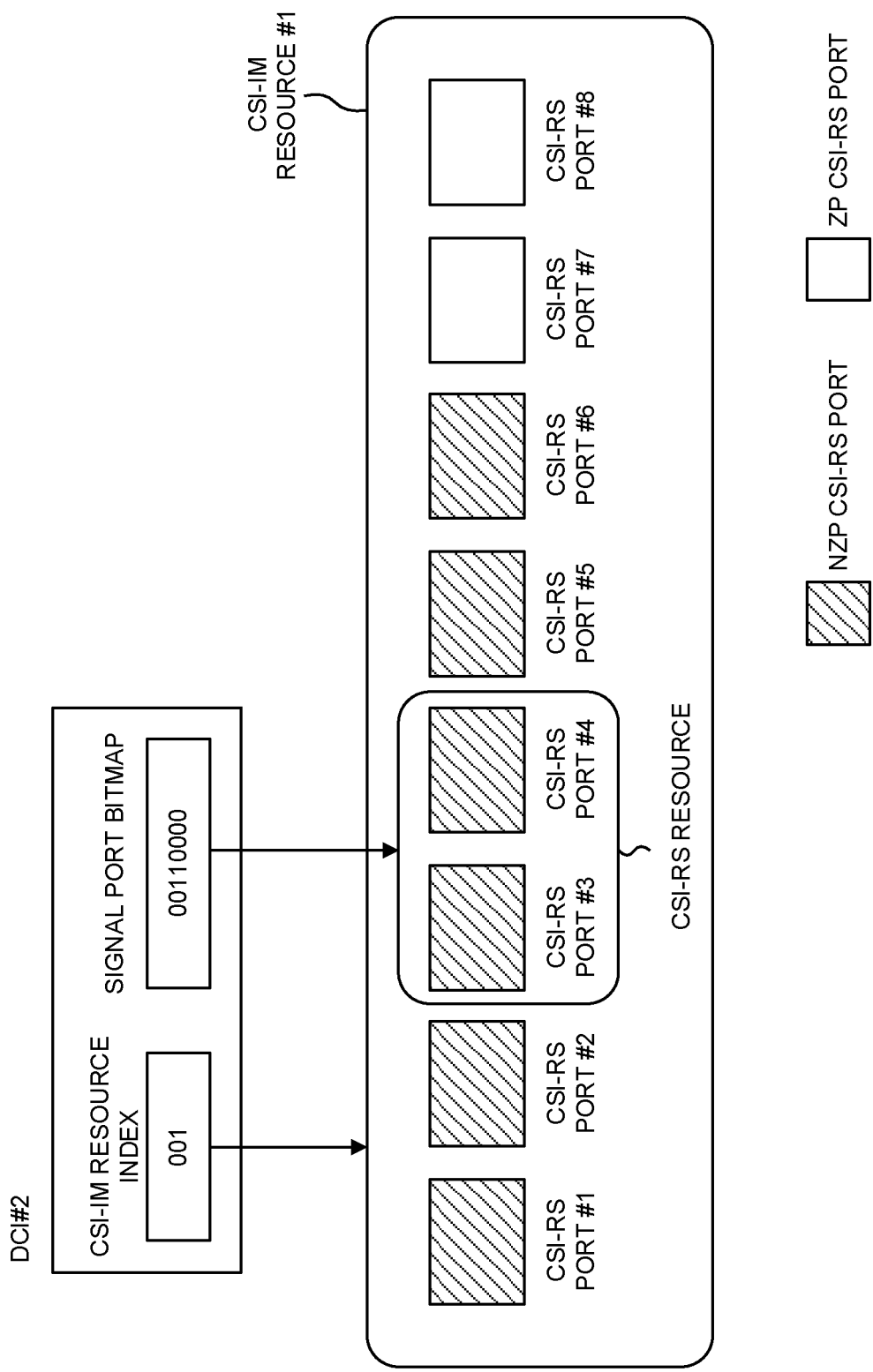
FIG. 7 is a diagram to show an example of DCI upon CSI measurement according to a third aspect of the present invention.

FIG. 7 is a diagram to show examples of DCIs upon CSI measurement according to the third aspect of the present invention.

Two fields for CSI measurement may be added to an existing DCI format. For example, the two fields are a three-bit CSI-IM resource index to indicate the CSI-IM resource and an N-bit signal port bitmap to indicate the CSI-RS resource. N is the maximum number of ports in one CSI-IM resource, for example. The bit position in the signal port bitmap may correspond to each port in the CSI-IM resource. In the signal port bitmap, the bits corresponding to the ports included in the CSI-RS resource may be configured to "1," and the other bits may be configured to "0."

When CSI measurement is commanded in a given slot, the DCI of that slot includes a CSI-IM resource index. Also, when CSI measurement to measure signal power is commanded in a given slot, the DCI of that slot contains a CSI-IM resource index and a signal port bitmap.

CSI measurement to measure signal power is commanded in a specific slot, so that DCI #2 of this slot includes a CSI-IM resource index and a signal port bitmap. In DCI #2, the CSI-IM resource index is "001," and the signal port bitmap is "00110000." Upon receiving DCI #2, the user terminal specifies CSI-IM resource #1 corresponding to the CSI-IM resource index "001." Furthermore, since the bit positions of "1" in the signal port bitmap are the third bit and the fourth bit, the user terminal specifies CSI-RS ports #3 and #4 as CSI-RS resources.

By thus showing the ports included in CSI-RS resources by using DCI, the radio base station can dynamically change the ports included in the CSI-RS resources.

As in the first aspect, before CSI measurement, multiple candidates for the CSI-RS resource may be configured in the user terminal. In this case, the radio base station may report different CSI-RS resources than the configured multiple candidates using DCI.

As in the third aspect, the PDSCH port in the second aspect may be reported using the signal port bitmap.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 8:
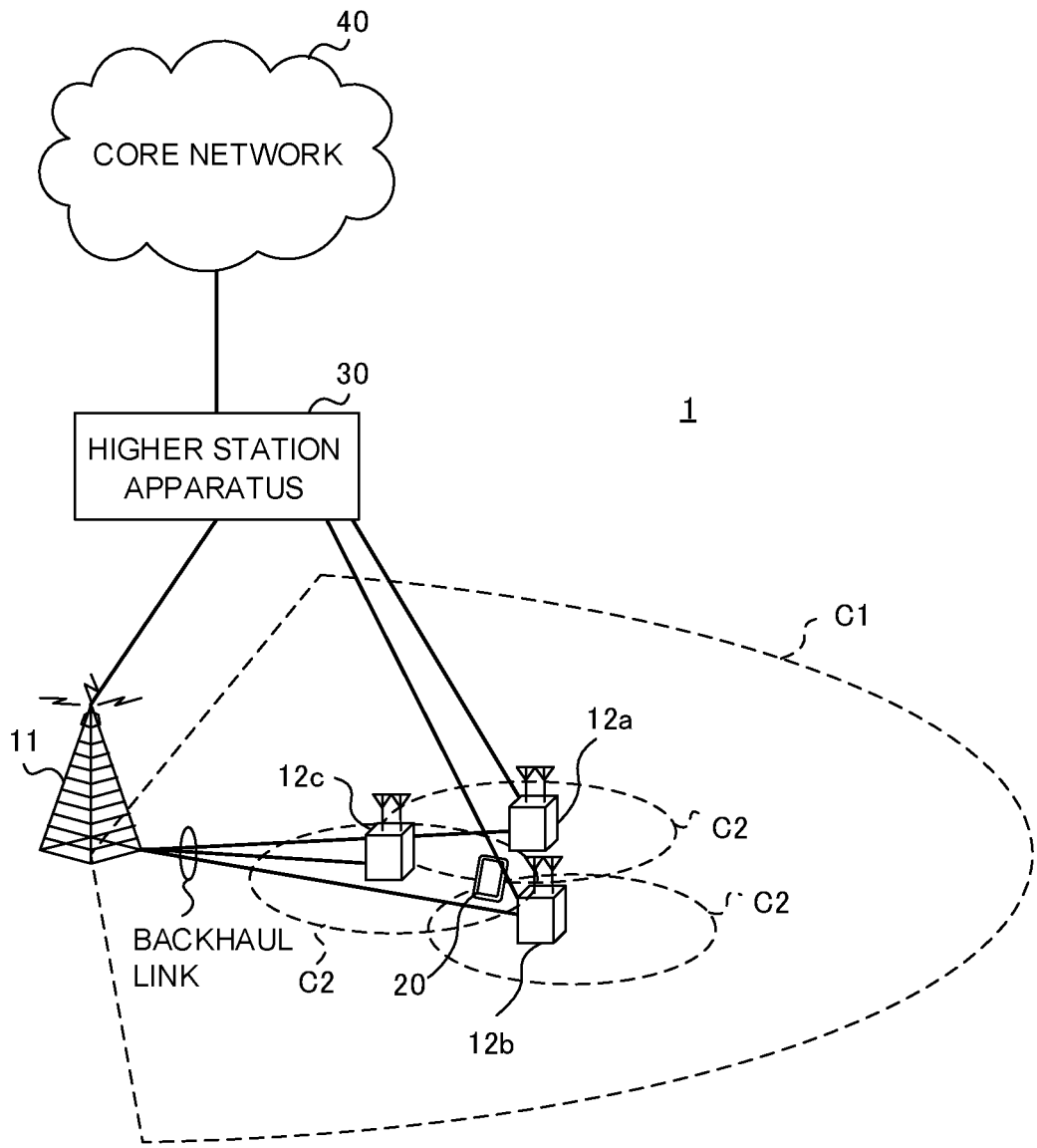
FIG. 8 is a diagram to show an example of a schematic structure of a radio communication system according to one embodiment of the present invention.

FIG. 8 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement of cells and user terminals 20 are not limited to those shown in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUS CH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 9:
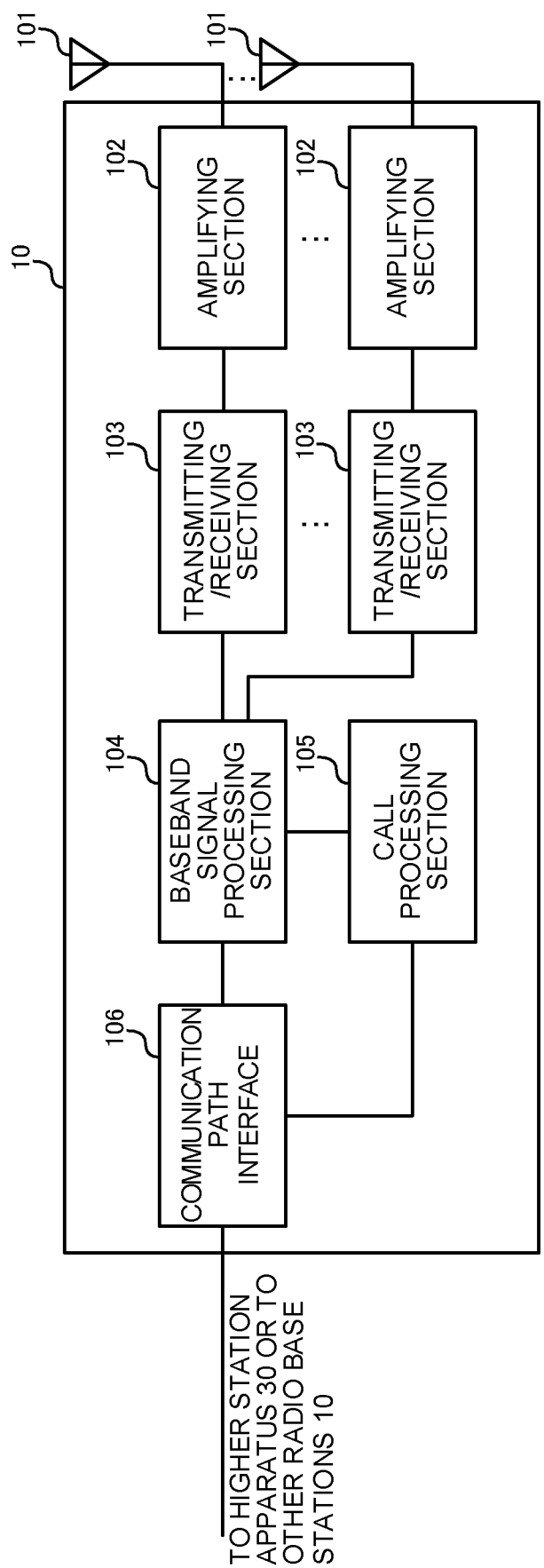
FIG. 9 is a diagram to show an example of an overall structure of a radio base station according to one embodiment of the present invention.

FIG. 9 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a given interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 may transmit information about an interference measurement resource, which includes a combinations of multiple ports and/or channels. The transmitting/receiving sections 103 may transmit information about a signal measurement resource, which includes at least one port and/or channel in the interference measurement resource.

Figure 10:
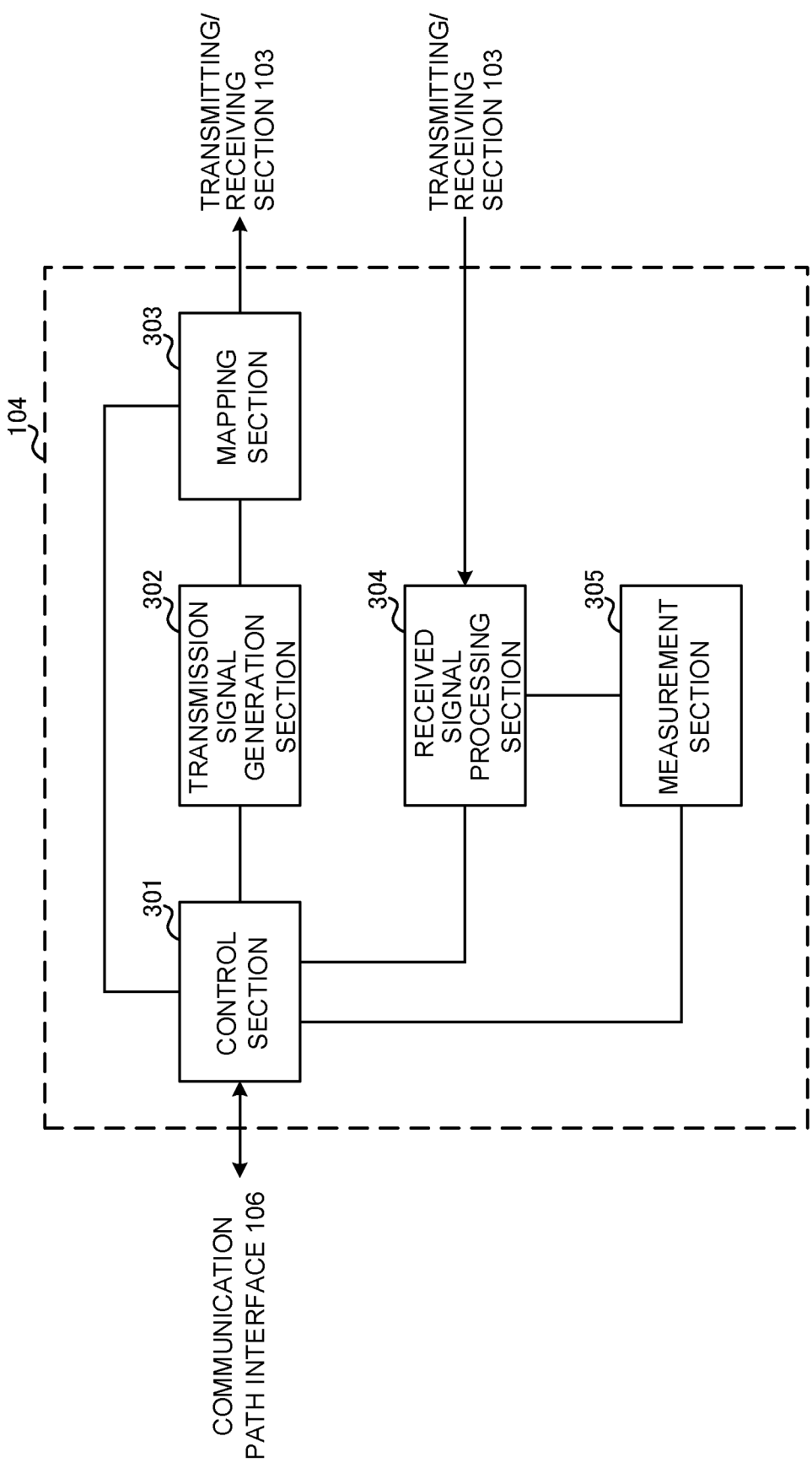
FIG. 10 is a diagram to show an example of a functional structure of a radio base station according to one embodiment of the present invention.

FIG. 10 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDSCH and/or the EPDCCH). Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 controls the scheduling of uplink data signals (for example, signals transmitted in the PUSCH), uplink control signals (for example, signals transmitted in the PUCCH and/or the PUSCH), random access preambles transmitted in the PRACH, uplink reference signals, and so on.

Also, the control section 301 may allocate an interference measurement resource. Also, the control section 301 may allocate a signal measurement resource. The signal measurement resource may be a port and/or a channel assigned to a DL signal addressed to the user terminal. Resources other than the signal measurement resource in the interference measurement resource may include a port and/or a channel to be assigned to DL signals addressed to other user terminals.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to given radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), the power strength (for example, RSSI (Received Signal Strength Indicator)), uplink channel information (for example, CSI) and so on. The measurement results may be output to the control section 301.

(User Terminal)

Figure 11:
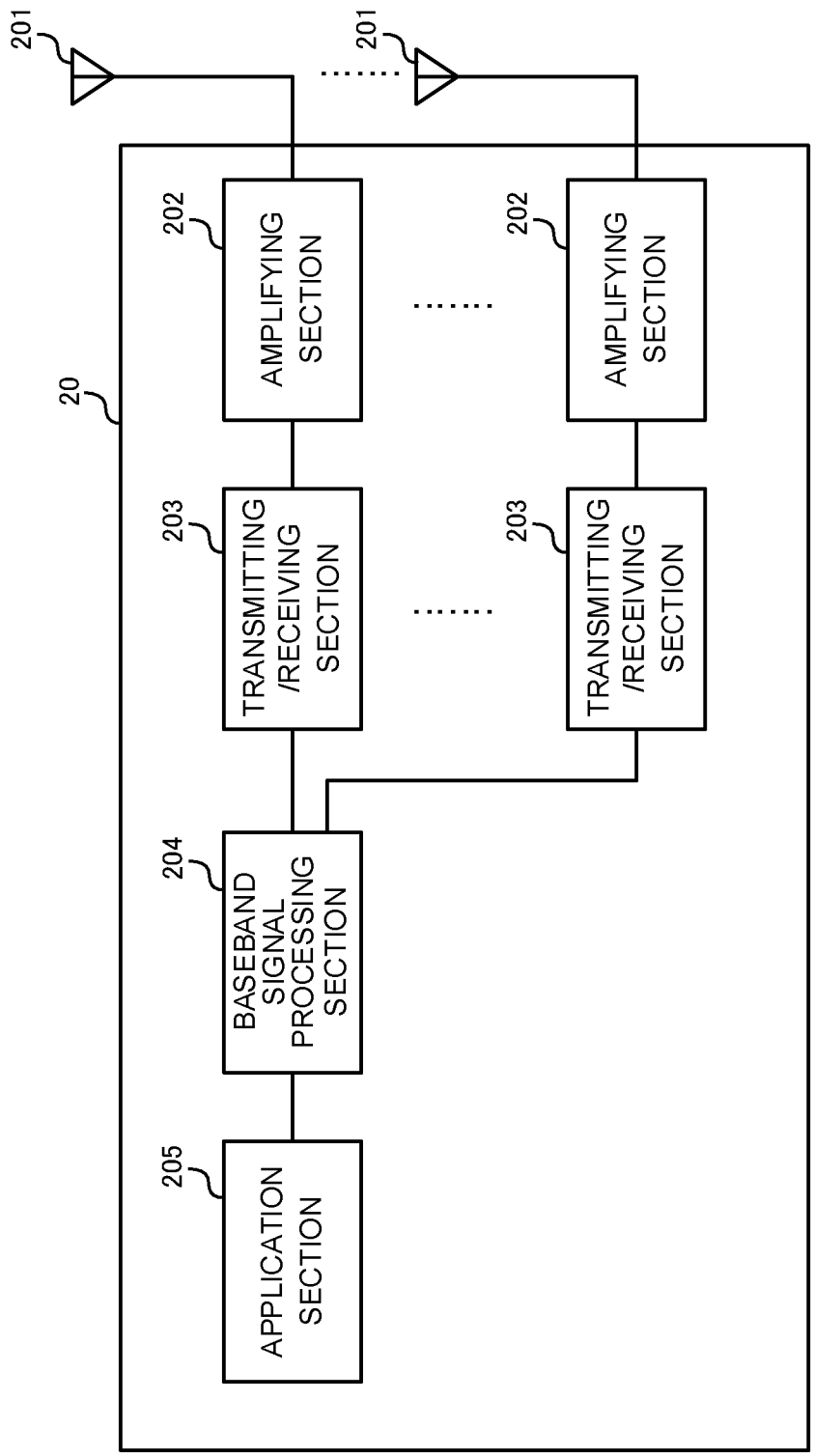
FIG. 11 is a diagram to show an example of an overall structure of a user terminal according to one embodiment of the present invention.

FIG. 11 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 may receive DL signals. In addition, the transmitting/receiving sections 203 may receive information related to an interference measurement resource, including a combination of multiple ports and/or channels. In addition, the transmitting/receiving sections 203 may receive information related to a signal measurement resource, including at least one port and/or channel in the interference measurement resource. In addition, the transmitting/receiving sections 203 may receive information related to the interference measurement resource for a specific period and information related to the signal measurement resource for a specific period. Also, the transmitting/receiving sections 203 may receive DL control information including information related to the interference measurement resource for a specific period and information related to the signal measurement resource for a specific period.

Figure 12:
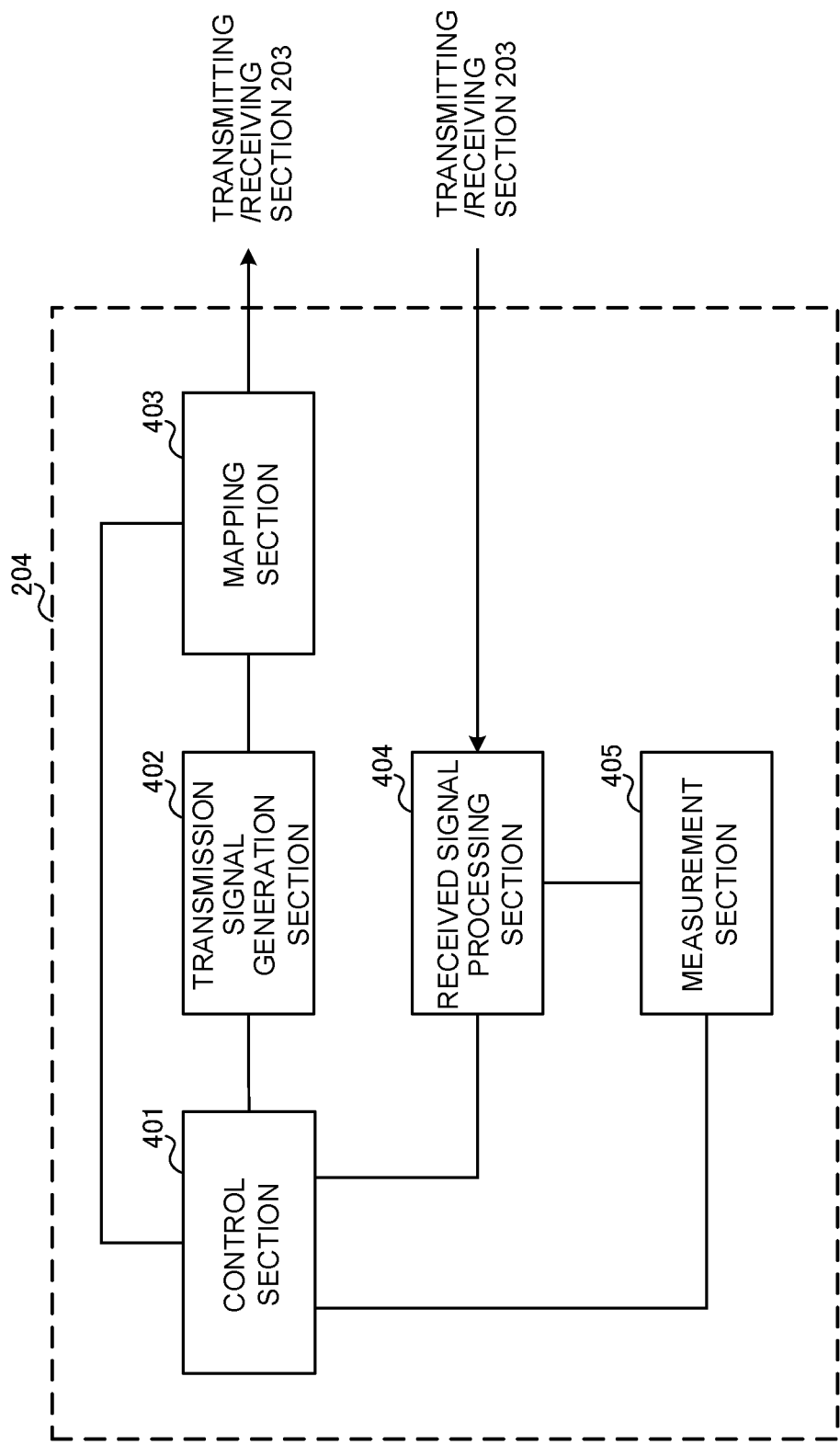
FIG. 12 is a diagram to show an example of a functional structure of a user terminal according to one embodiment of the present invention.

FIG. 12 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires downlink control signals (for example, signals transmitted in the PDCCH/EPDCCH) and downlink data signals (for example, signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

Furthermore, the control section 401 may control the measurements of DL signals. In addition, the control section 401 may control DL signal measurements based on information related to the interference measurement resource. Furthermore, the control section 401 may control the measurement of signal power based on a DL signal in the signal measurement resource. Also, if the user terminal 20 receives information related to the interference measurement resource for a specific period and the signal measurement resource for a specific period, the control section 401 may control interference power measurements based on the DL signals of resources other than the signal measurement resource in the interference measurement resource. Furthermore, the control section 401 may control the measurement of interference power from other user terminals in the instant cell based on a DL signal of a resource allocated to a given reference signal among resources other than the signal measurement resource in the interference measurement resource.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on received signals. The measurement section 405 may measure the received power (for example, RSRP), the received quality (for example, RSRQ, SINR, etc.), the power strength (for example, RSSI), downlink channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

For example, the radio base station, user terminals and so on according to embodiments of the present invention may function as a computer that executes the processes of the radio communication method of the present invention.

Figure 13:
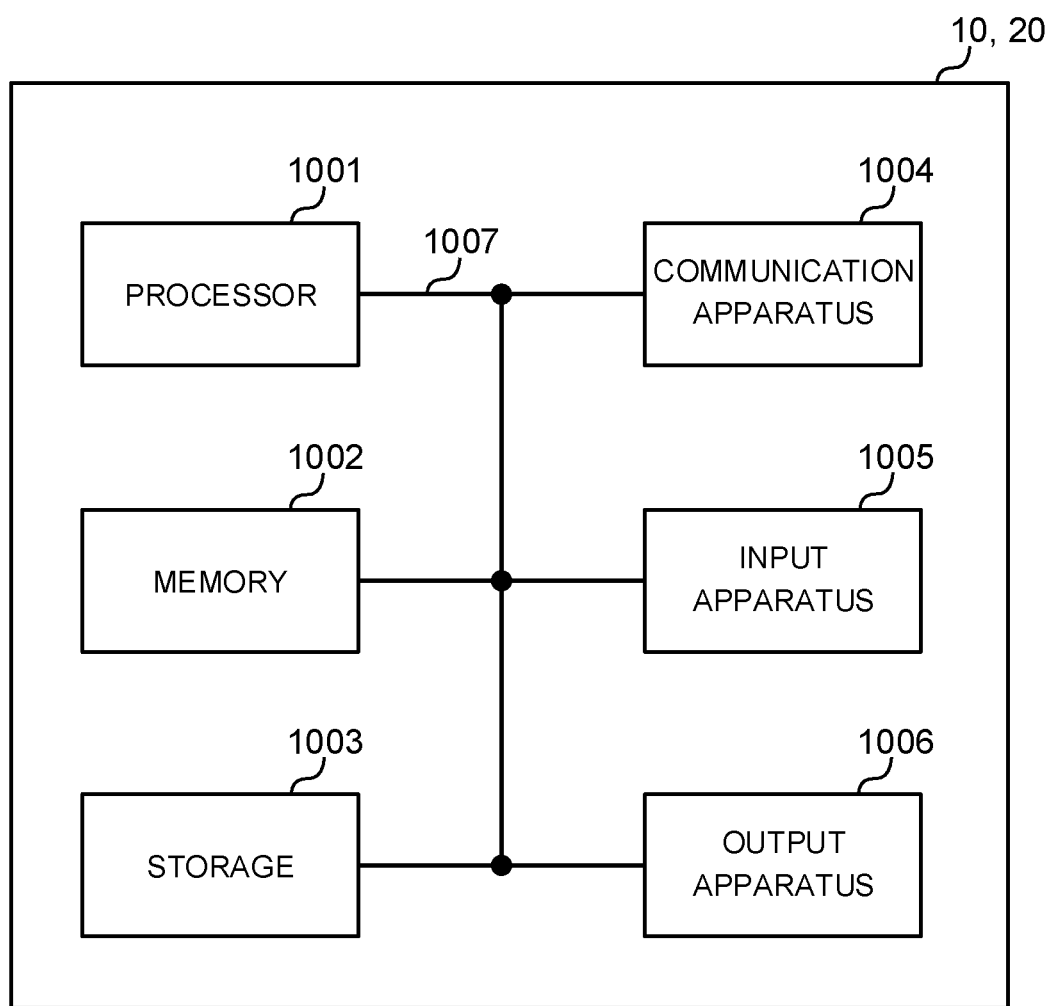
FIG. 13 is a diagram to show an example hardware structure of a radio base station and a user terminal according to one embodiment of the present invention.

FIG. 13 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

Also, a slot may be a time unit based on neurology. Also, a slot may include a plurality of minislots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval" (TTI), or a plurality of consecutive subframes may be referred to as a "TTI," or one slot or minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "minislot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "minislot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB: Physical RB)," a "subcarrier group (SCG)," a "resource element group (REG)," a "PRB pair," an "RB pair" and so on.

Furthermore, a resource block may be comprised of one or more resource elements (REs). For example, one RE may be a radio resource region of one subcarrier and one symbol.

Note that the structures of radio frames, subframes, slots, minislots, symbols and so on described above are merely examples. For example, configurations pertaining to the number of subframes included in a radio frame, the number of slots included in a subframe, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented in other information formats. For example, radio resources may be specified by given indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX(registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a receiver that receives, via higher layer signaling, configuration information which indicates non-zero power (NZP) resources to which transmit power for channel state information reference signal (CSI-RS) is distributed and indicates zero power (ZP) resources to which transmit power for CSI-RS is not distributed, and receives a downlink control information including an identification information for specifying a channel measurement resource being one from among the NZP resources, a NZP interference measurement resource being one other than the channel measurement resources from among the NZP resources, and a ZP interference measurement resource being one from among the ZP resources; and
a processor that:
specifies, based on the configuration information and the downlink control information, the channel measurement resource, the NZP interference measurement resource, and the ZP interference measurement resource,
measures signal power using the channel measurement resource, and
measures total power of interference and noise using the NZP interference measurement resource and the third ZP interference measurement resource.

2. The terminal according to claim 1, wherein the configuration information includes information about a CSI-RS port.

3. A radio communication method for a terminal, comprising:
receiving, via higher layer signaling, configuration information which indicates non-zero power (NZP) resources to which transmit power for channel state information reference signal (CSI-RS) is distributed and zero power (ZP) resources to which transmit power for CSI-RS is not distributed;
receiving a downlink control information including an identification information for specifying a channel measurement resource being one from among the NZP resources, a NZP interference measurement resource being one other than the channel measurement resources from among the NZP resources, and a ZP interference measurement resource being one from among of the ZP resources;
specifying, based on the configuration information and the downlink control information, the channel measurement resource, the NZP interference measurement resource, and the ZP interference measurement resource;
measuring signal power using the first channel measurement resource; and
measuring total power of interference and noise using the NZP interference measurement resource and the ZP interference measurement resource.

4. A base station comprising:
a transmitter that transmits, via higher layer signaling, configuration information which indicates non-zero power (NZP) resources to which transmit power for channel state information reference signal (CSI-RS) is distributed and indicates zero power (ZP) resources to which transmit power for CSI-RS is not distributed, and transmits a downlink control information including an identification information for specifying a channel measurement resource being one from among the NZP resources, a NZP interference measurement resource being one other than the channel measurement resources from among the NZP resources, and a ZP interference measurement resource being one from among of the ZP resources; and
a processor that controls:
specifying, based on the configuration information and the downlink control information, the channel measurement resource, the NZP interference measurement resource, and the ZP interference measurement resource;
measuring signal power using the channel measurement resource; and
measuring total power of interference and noise using the NZP interference measurement resource and the ZP interference measurement resource.

5. A system comprising:
a terminal that comprises:
a receiver that receives, via higher layer signaling, configuration information which indicates non-zero power (NZP) resources to which transmit power for channel state information reference signal (CSI-RS) is distributed and indicates zero power (ZP) resources to which transmit power for CSI-RS is not distributed, and receives a downlink control information including an identification information for specifying a channel measurement resource being one from among the NZP resources, a NZP interference measurement resource being one other than the channel measurement resources from among the NZP resources, and a ZP interference measurement resource being one from among of the ZP resources; and a processor that:
specifies, based on the configuration information and the downlink control information, the channel measurement resource, the NZP interference measurement resource, and the ZP interference measurement resource,
measures signal power using the channel measurement resource, and
measures total power of interference and noise using the NZP interference measurement resource and the ZP interference measurement resource; and a base station that transmits the configuration information and transmits the downlink control information.

* * * * *